US008985445B2

(12) United States Patent
Patel et al.

(10) Patent No.: US 8,985,445 B2
(45) Date of Patent: Mar. 24, 2015

(54) PAYMENT TRANSACTION RECEIPT SYSTEM AND METHOD

(71) Applicant: Barclays Bank PLC, London (GB)

(72) Inventors: Pratik Patel, Oadby (GB); James Gardiner, Newport Pagnell (GB)

( * ) Notice: Subject to any disclaimer, the term of this patent is extended or adjusted under 35 U.S.C. 154(b) by 0 days.

(21) Appl. No.: 13/668,779

(22) Filed: Nov. 5, 2012

(65) Prior Publication Data

US 2013/0221093 A1  Aug. 29, 2013

(30) Foreign Application Priority Data

Feb. 28, 2012  (GB) .................................. 1203443.5

(51) Int. Cl.
| | |
|---|---|
| *G06F 17/00* | (2006.01) |
| *G06K 7/01* | (2006.01) |
| *G06Q 20/30* | (2012.01) |
| *G06Q 20/02* | (2012.01) |
| *G06Q 20/04* | (2012.01) |
| *G06Q 20/32* | (2012.01) |

(52) U.S. Cl.
CPC ................ *G06Q 20/30* (2013.01); *G06Q 20/02* (2013.01); *G06Q 20/0453* (2013.01); *G06Q 20/3223* (2013.01)
USPC .......................................... 235/383; 235/375

(58) Field of Classification Search
USPC .................. 235/375, 380, 383, 451, 492, 379
See application file for complete search history.

(56) References Cited

U.S. PATENT DOCUMENTS

| | | | | |
|---|---|---|---|---|
| 7,487,912 | B2 * | 2/2009 | Seifert et al. .................. | 235/380 |
| 7,552,087 | B2 * | 6/2009 | Schultz et al. .................. | 705/39 |
| 7,748,621 | B2 * | 7/2010 | Gusler et al. .................. | 235/383 |
| 8,346,634 | B2 * | 1/2013 | Shiftan et al. ................... | 705/28 |
| 2004/0220964 | A1 * | 11/2004 | Shiftan et al. ............. | 707/103 R |
| 2006/0273163 | A1 | 12/2006 | Gusler et al. | |
| 2008/0035724 | A1 * | 2/2008 | Vawter ......................... | 235/380 |
| 2009/0271265 | A1 * | 10/2009 | Lay et al. .................. | 705/14.38 |
| 2009/0271322 | A1 * | 10/2009 | Lay et al. ........................ | 705/75 |
| 2011/0137803 | A1 | 6/2011 | Willins | |
| 2011/0161230 | A1 | 6/2011 | Singh | |
| 2011/0231285 | A1 | 9/2011 | Englund et al. | |
| 2012/0084391 | A1 * | 4/2012 | Patel et al. .................... | 709/217 |
| 2012/0211561 | A1 * | 8/2012 | Lieberman et al. ........... | 235/383 |

FOREIGN PATENT DOCUMENTS

| | | |
|---|---|---|
| EP | 1240631 | 9/2002 |
| WO | WO0141527 | 6/2001 |
| WO | WO0149714 | 7/2001 |
| WO | WO0195170 | 12/2001 |

* cited by examiner

*Primary Examiner* — Tuyen K Vo
(74) *Attorney, Agent, or Firm* — Cowan, Liebowitz & Latman, P.C.; Steven D. Underwood

(57) ABSTRACT

A system and method of providing receipt data for a payment transaction through a transaction receipt portal system are described, in which receipt data is stored for a completed payment transaction received from a remote merchant system, the receipt data being associated with a customer and a merchant registered with the system, and stored receipt data is provided to the associated registered customer or merchant. A card payment transaction involves receiving, by a computing device, an electronic receipt from the merchant system, the electronic receipt including data for retrieving stored receipt data from the transaction receipt portal system.

9 Claims, 3 Drawing Sheets

PAYMENT TRANSACTION RECEIPT SYSTEM AND METHOD

FIELD OF THE INVENTION

This invention relates to a transaction payment system, and more particularly to a system and method for providing access to electronic receipt data for card payment transactions.

BACKGROUND OF THE INVENTION

Payment transaction systems that use a mobile data terminal to handle credit/debit card transactions for a merchant are known. Typically, the merchant's data terminal is a mobile smartphone, tablet computer or portable computing device with cellular data communication capabilities, such as General Packet Radio Service (GPRS), Enhanced Data rates for GSM Evolution (EDGE) or 3G (3rd generation mobile telecommunications technology), and are capable of running a payment application. A payment card reader and paper receipt printer are also typically provided as peripheral devices in communication with the data terminal. The payment application preferably provides accounting functions for the merchant, such as calculating a total bill, printing receipts, providing summaries of transactions etc. and the payment application can communicate electronically with a transaction processing back-end server to process and settle the transactions.

Examples of such known systems are described in GB No. 2427059 (Bristol Office Machines), EP No. 0741884 (mCom Solutions) and EP No. 1240631 (Swisscom Mobile AG).

In such known card payment systems, cardholders typically expect to receive a paper receipt printed at the physical point of sale. As card payment systems move towards a paperless environment, systems have been developed to provide digital receipts to a mobile phone, for example, a system by Proximiant, Inc.

However, there is a need for a more efficient, flexible and secure system for providing access to receipt data associated with the completed transactions.

STATEMENTS OF THE INVENTION

According to one aspect of the present invention, a payment transaction system is provided, comprising a merchant system operable to process a payment transaction for a customer through a merchant mobile electronic device and to verify an authentication token associated with the customer before settling the payment transaction The payment transaction system includes a transaction receipt portal system having means for storing receipt data for a completed payment transaction received from the merchant system. The receipt data is associated with a customer and a merchant registered with the system. There is also included means for providing stored receipt data to the associated registered customer or merchant. The system is operable to store receipt data for the settled payment transaction received from the merchant system. The customer computing device is operable to receive an electronic receipt from the merchant system and the electronic receipt includes data for retrieving stored receipt data from the transaction receipt portal system.

In yet another aspect there is provided a computer program arranged to configure the payment transaction system as described above.

In other aspects, there is provided a method of operating a receipt portal system as described above. In yet another aspect there is provided a computer program arranged to carry out the method when executed by suitable programmable devices.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

Card Payment Background

Figure 1:
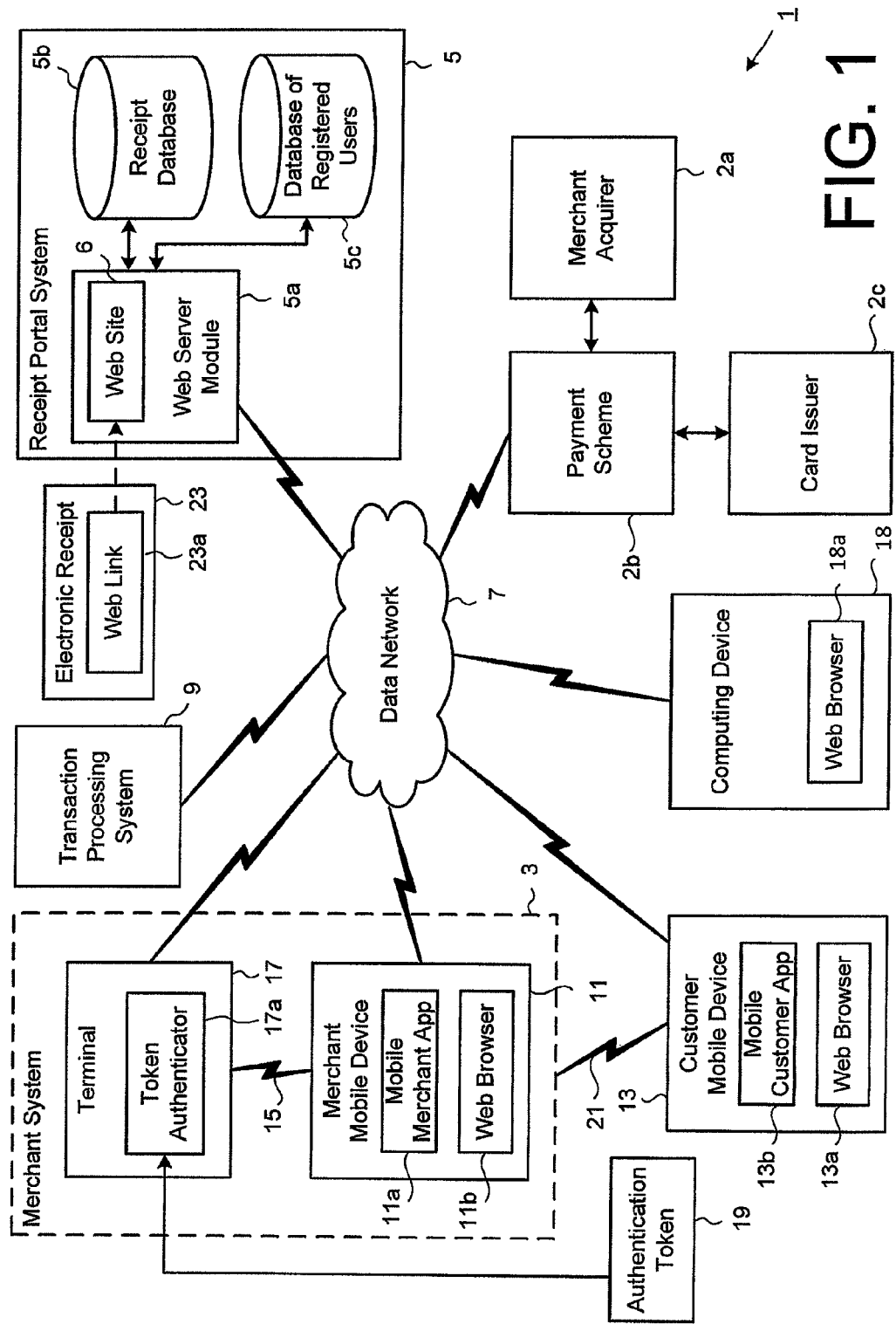
FIG. 1 is a block diagram showing the main components of a payment transaction system according to an embodiment of the invention.

Card payments are a way of paying for goods and services without cash changing hands. When paying for goods and service using a card payments, the presentation of the card details and appropriate card holder authentication guarantee the merchant payment. A conventional card payment system is made up of a number of components including a card holder, a merchant, a merchant acquirer, a scheme and a card issuer. As is appreciated by those skilled in the art, the cardholder is the consumer purchasing goods or services with a card, the merchant is selling the goods or services to the consumer, the merchant acquirer is an intermediary that functions to process the transaction on behalf of the merchant and card issuer, the scheme refers to the entity operating a specific transaction protocol (i.e., rules for the interchange) in which the cardholder, merchant, merchant acquirer and card issuer have agreed to participate, and the card issuer is the bank or other entity offering the cards directly to the consumer and ultimately assuming financial liability for the transaction by providing the cardholder with a line of credit.

In the normal process, the card holder presents his card (or token) to the merchant in order to pay for goods or services rendered. The transaction may take place over any one of a number of channels (in store or via the Internet, for example). The merchant, through his acquirer, is set up to accept different card types by scheme (Visa®, MasterCard®, Amex®, credit, debit, for example). When a card is presented, the card holder is authenticated (by Personal Identification Number, PIN, passcode, or Card Verification Value, CV2, for example), subject to channel and merchant capability, and the transaction is submitted to the merchant's acquirer (referred to herein as "merchant acquirer") for authorization. Authorisation and authentication of the merchant and/or card holder may instead or additionally be handled through a trusted third party authentication system that is known to the merchant acquirer.

Once the transaction is received, the merchant acquirer routes the authorization transaction, in real time, to the relevant scheme based upon card type. The scheme provides isolation between merchant acquirers and card issuers for routing of authorisations, settlements and funds movement. The merchant acquirer doesn't need to know who the card issuer is, just which scheme to route it to which is determined by Bank Identification Number (BIN).

The card issuer authorizes the transaction based upon the card holder's balance and other risk/fraud criteria and returns an authorised message and authorisation code to the scheme, which routes it back to the merchant acquirer who sends it to the merchant. The merchant then confirms the sale, which posts a settlement transaction to the merchant acquirer; this is a mandate to make the payment and move funds. The settlement transaction is routed between merchant acquirers and card issuers via the scheme.

Technical Architecture

Referring to FIG. 1, a payment transaction system 1 according to an embodiment of the invention. The payment transaction system 1 functions by processing, by a merchant system 3, a payment transaction through a merchant mobile electronic device 11 and verifying an authentication token 19 before settling the payment transaction. The method further includes storing, in a transaction receipt portal system 5 remote from the merchant system 3, receipt data for a completed payment transaction received from the merchant system 3, the receipt data being associated with a customer and a merchant registered with the payment transaction system 1. A computing device receives an electronic receipt from the merchant system 3, the electronic receipt including data for retrieving stored receipt data from the transaction receipt portal system 5. The transaction receipt portal system 5 provides stored receipt data to the associated registered customer or merchant.

The payment transaction system 1 comprises a merchant system 3 in communication with an external transaction receipt portal system 5 over a data network 7. The payment transaction system 1 also includes merchant acquirer 2a, payment scheme 2b and card issuer 2c components as typically provided in a conventional card payment system, and need not be described further. In this embodiment, transaction processing over the data network 7 is handled by a transaction processing system 9 hosted by a trusted third party that is known to the merchant acquirer 2a. Alternatively, the transaction processing system 9 may be provided as a component of the merchant acquirer 2a.

The data network 7 is preferably any suitable data communication network such as a wireless network, a local- or wide-area network including a corporate intranet or the Internet, using for example the TCP/IP protocol, or a cellular communication network such as GPRS, EDGE or 3G, for example. Such communication protocols are of a type that are known to those skilled in the art of data networks and need not be described further.

The merchant system 3 handles payment transactions, such as credit/debit card transactions, through a merchant application 11a running on a mobile electronic device 11. In a typical payment transaction process, the merchant application 11a can receive data identifying goods and/or services associated with the payment transaction, apply discounts or vouchers, determine the total amount due for payment, and initiate authentication of the customer's payment instrument. In this embodiment, the merchant application 11a communicates with a merchant authentication terminal 17 of the merchant system 3 to verify an authentication token 19 associated with a customer using a token authenticator 17a, before the payment transaction can be settled and completed. In one exemplary embodiment, the authentication token 19 is a credit or debit card with an integrated chip and the token authenticator 17b is a card reader for receiving and verifying the card holder's PIN, passcode or CV2, as is known to those skilled in the art. It will be appreciated that any other form of token authentication can be used, such as a near field communication (NFC) mobile communication device, a mobile phone or portable computing device, or a biometric authentication device, for example.

The merchant mobile electronic device 11 is a mobile smartphone, tablet computer or portable computing device with cellular data communication capabilities, for communicating Short Message Service (SMS) messages to a customer mobile electronic device 13 over a mobile network communication path 21. The merchant mobile electronic device 11 also includes network data communication capabilities for communicating with the merchant system 3, transaction receipt portal system 5 and the customer mobile electronic device 13 via the data network 7. It will be appreciated that in some embodiments, the mobile network communication path 21 will be through the data network 7. The merchant application 11a is preferably secured by means of a passcode and information associated with a payment transaction is provided via the secure merchant application 11a running on the mobile electronic device 11. Electronic data communication by the merchant application 11a can be encrypted.

The merchant mobile electronic device 11 and the merchant authentication terminal 17 may communicate data over the data network 7. Additionally, or alternatively, the merchant mobile electronic device 11 and the merchant authentication terminal 17 can be communicatively coupled via a direct communication path 15, for example a wired connection, a Bluetooth (®) connection or an infrared data connection.

The merchant system 3 is thereby capable of transmitting an electronic receipt 23 for a completed transaction to one or more designated sources of the cardholder associated with the transaction, for example as an SMS message to the customer mobile electronic device 13 and/or as an e-mail message to the cardholder's e-mail address for retrieval and display by the customer mobile electronic device 13 and/or a computing device 18.

The electronic receipt 23 includes a portion of the details associated with the completed transaction, for example basic details identifying the transaction, and a web link embedding a Universal Location Resource (URL) of a receipt portal website hosted by the transaction receipt portal system 5 to facilitate access by the card holder to all of the details associated with the completed transaction stored in a receipt database 5b. The web server module 5a of the transaction receipt portal system 5 is also capable of registering card holders and merchants as users of the transaction receipt portal system 5 that are registered to access the receipt database 5b. The web server module 5a accesses a database of registered users 5c to control user access to the receipt portal web site through a log in process.

The merchant mobile electronic device 11 and the customer mobile electronic device 13 are capable of running respective web browser applications 11b, 13a for retrieving receipt data stored in the receipt database 5b of the transaction receipt portal system 5. The customer mobile electronic device 13 is also capable of running a mobile customer application 13b for accessing the receipt database 5b through the web server module 5a.

A computing device 18, such as a personal computer, a laptop, a computing terminal or the like, running a web browser application 18a, can also be used to communicate with the transaction receipt portal system 5 over the data network 7, to retrieve receipt data stored in the receipt database 5b through the web server module 5a.

Transaction Receipt Data Provisioning

An example of a process of providing transaction receipt details to a customer will now be described, to illustrate the technical advantage of the receipt portal system embodiment described above.

Figure 2:
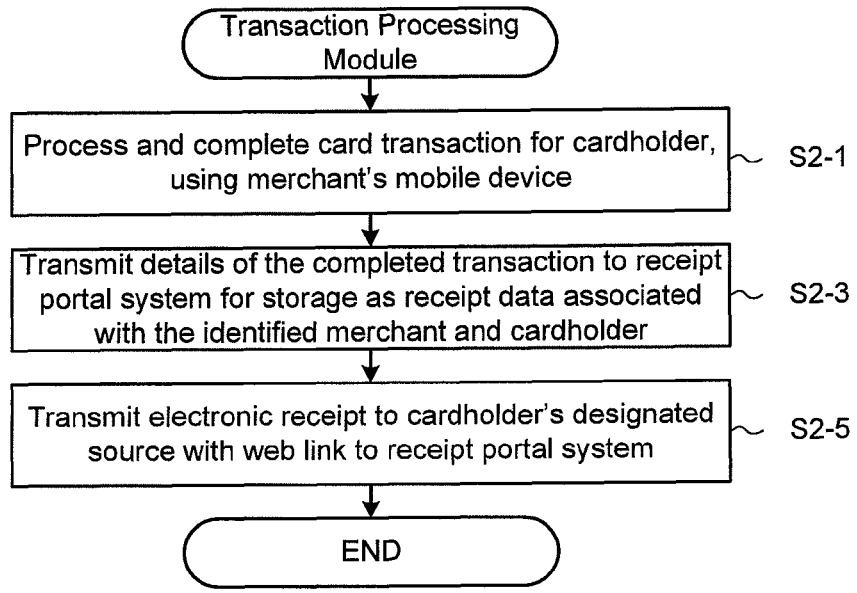
FIG. 2 is a flow diagram illustrating processing steps performed by the payment transaction system of FIG. 1.

FIG. 2 shows a flow diagram of the process of storing transaction receipt details in the receipt database 5b that is provided in the remote transaction receipt portal system 5. The process begins at step S2-1 where the transaction processing system 9 processes and completes a card transaction for a cardholder. As described above, this processing step is conventional and involves using the merchant mobile electronic device 11 to manage the transaction details and to authenticate the card holder's token 19 using the token authenticator 17a. The merchant mobile electronic device 11 also submits the transaction to the merchant's acquirer 2a via a payment scheme 2b for authorization.

After the transaction processing system 9 receives confirmation that the transaction has been authorized, then at step S2-3, the transaction processing system 9 transmits details of the settled payment transaction to the transaction receipt portal system 5. The transaction receipt portal system 5 stores the received transaction details as receipt data for a completed transaction in the receipt database 5b. The receipt data includes data identifying the merchant and the card holder associated with the completed transaction. At step S2-5, the merchant system 3 transmits an electronic receipt 23 for the completed transaction to the associated card holder, for example as an e-mail message to the cardholder's e-mail address and/or as an SMS or mobile phone data message to the customer mobile electronic device 13. It will be appreciated that the card holder may provide one or more designated sources to receive the electronic receipt from the merchant system 3 as part of the transaction process carried out using the merchant mobile electronic device 11. The electronic receipt 23 includes basic information identifying the completed transaction and a web link 23a to the receipt portal web site 6 hosted by the web server module 5a of the transaction receipt portal system 5.

Figure 3:
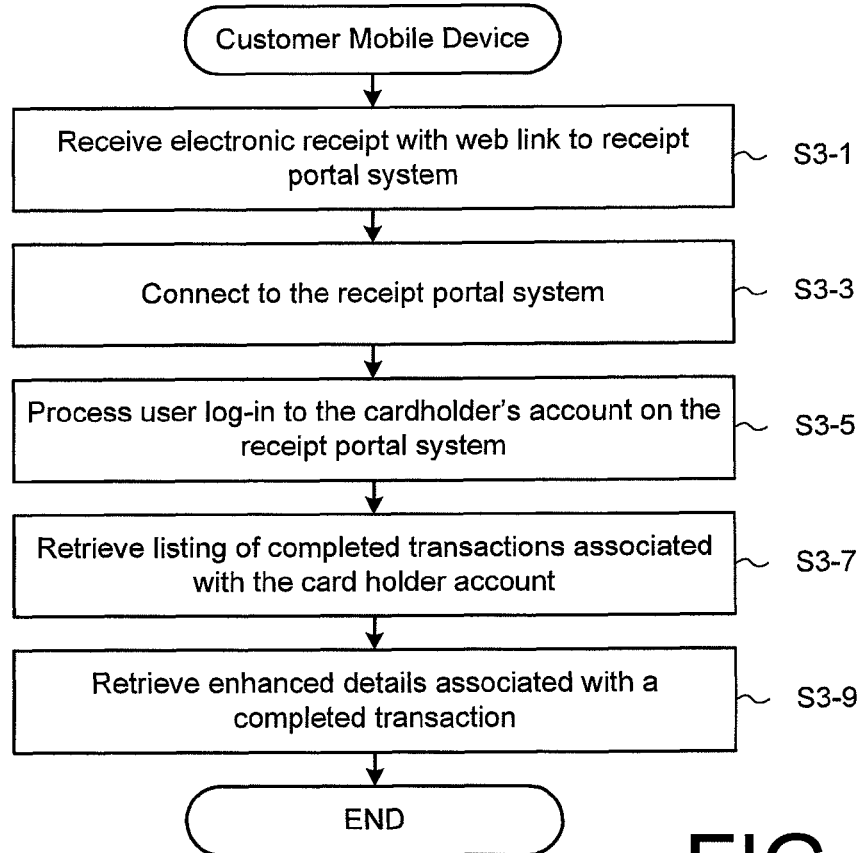
FIG. 3 is a flow diagram illustrating processing steps performed by the payment transaction system of FIG. 1 in accordance with an alternate embodiment.

FIG. 3 shows a flow diagram of the process of retrieving transaction receipt details from the receipt database 5b of the remote transaction receipt portal system 5. At step S3-1, the customer mobile electronic device 13 receives the electronic receipt 23 from the merchant system 3, including the web link 23a to the transaction receipt portal system 5. At step S3-3, the customer mobile electronic device 13 retrieves a log in web page of the receipt portal web site 6 from the web server module 5a, for example in response to the card holder input to select the web link 23a in the electronic receipt 23. At step S3-5, user log-in to the transaction receipt portal system 5 is processed by the web server module 5a, by verifying that the card holder has a registered account in the database of registered users 5c. It will be appreciated that the first time a user visits the receipt portal web site 6, he or she can be prompted to register an account on the transaction receipt portal system 5.

After verifying that the card holder is a registered user and processing the user log-in to the card holder's account, the customer mobile electronic device 13 retrieves details of transactions associated with the card holder. For example, the web server module 5a provides a list of all recent transactions which resulted in an electronic receipt 23 to the card holder for display by the customer mobile electronic device 13 at step S3-7. The card holder can then provide input to select one of the listed transactions in order to retrieve further details and processing options associated with the selected transaction at step S3-9. The further details and processing options include enhanced data from the completed transaction such as line item purchases, merchant details including contact details, location of the merchant and transaction if captured, options to follow up with the merchant for example to request a refund, and the like.

It will be appreciated that the process illustrated in FIG. 3 can be alternatively or additionally carried out by the computing device 18 for a card holder or merchant registered with the transaction receipt portal system 5, or by the merchant mobile electronic device 11.

In this way, card holders receive an electronic receipt, for example by e-mail or SMS, following a card purchase using the payment system 1 of the above embodiment. Using details from the electronic receipt, the card holder can connect and log in to a receipt portal system in order to view and print enhanced data about the completed transactions. The payment system provides an architecture and mechanism for secure and efficient retrieval of data associated with completed transactions through a portal system that is independent of the merchant system, whereby the card holder does not need to contact the merchant system to access the desired information. The card holder can be efficiently informed by the merchant system that the transaction is complete through an electronic receipt containing a brief portion of the details associated with the transaction, and the card holder can retrieve further enhanced details securely and directly from the receipt portal system.

Computer Systems

Figure 4:
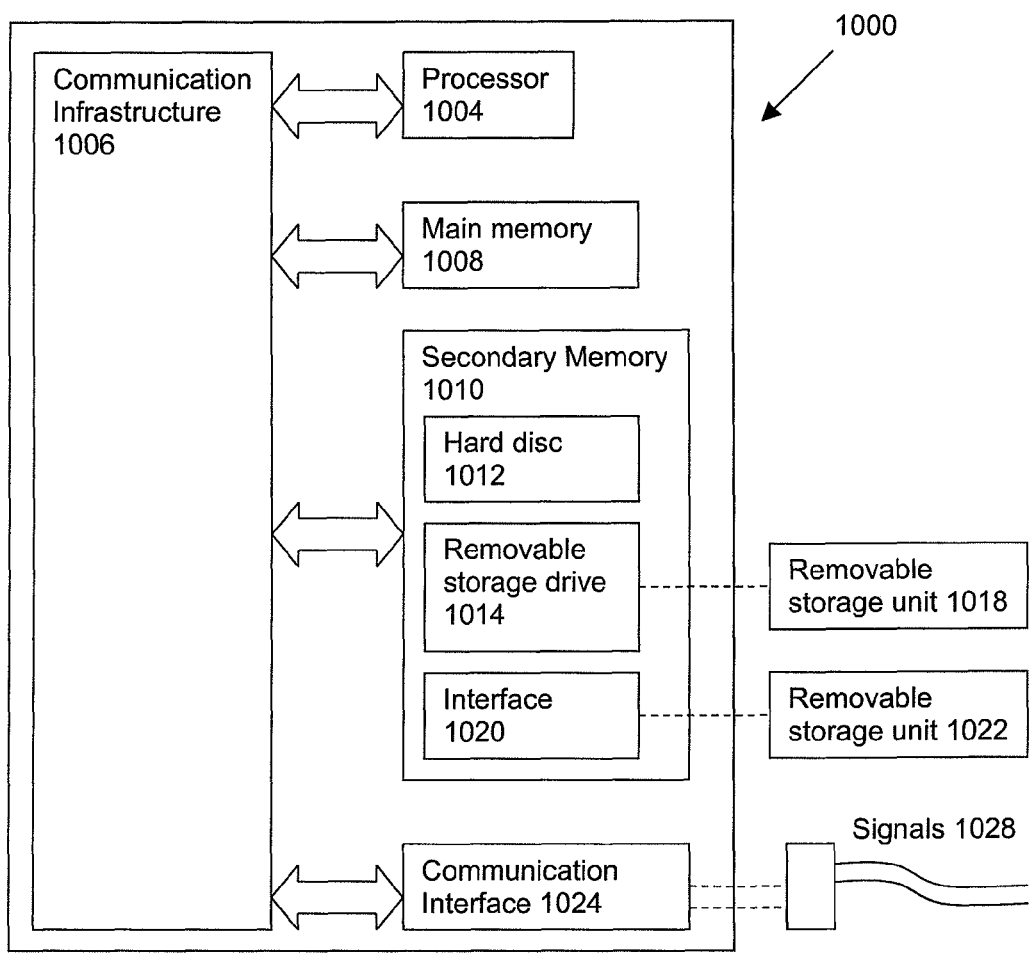
FIG. 4 is a diagram of an example of a computer system on which one or more of the functions of the embodiment may be implemented.

The entities described herein, such as the merchant system and the receipt portal system, and their respective constituent modules and components, may be implemented by computer systems such as the computer system 1000 shown in FIG. 4. Embodiments of the present invention may be implemented as programmable code for execution by such computer system 1000. After reading this description, it will become apparent to a person skilled in the art how to implement the invention using other computer systems and/or computer architectures.

The computer system 1000 includes one or more processors, such as processor 1004. The processor 1004 may be any type of processor, including but not limited to a special purpose or a general-purpose digital signal processor. The processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

The computer system 1000 also includes a main memory 1008, preferably random access memory (RAM), and may also include a secondary memory 610. The secondary memory 1010 may include, for example, a hard disk drive 1012 and/or a removable storage drive 1014, representing a floppy disk drive, a magnetic tape drive, an optical disk drive, etc. A removable storage drive 1014 reads from and/or writes to a removable storage unit 1018 in a well-known manner. The removable storage unit 1018 represents a floppy disk, magnetic tape, optical disk, etc., which is read by and written to by a removable storage drive 1014. As will be appreciated, the removable storage unit 618 includes a computer usable storage medium having stored therein computer software and/or data.

In alternative implementations, the secondary memory 1010 may include other similar means for allowing computer programs or other instructions to be loaded into the computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from the removable storage unit 1022 to the computer system 1000. Alternatively, the program may be executed and/or the data accessed from the removable storage unit 1022, using the processor 1004 of the computer system 1000.

The computer system 1000 may also include a communication interface 1024. The communication interface 1024 allows software and data to be transferred between the computer system 1000 and external devices. Examples of a communication interface 1024 may include a modem, a network interface (such as an Ethernet card), a communication port, a Personal Computer Memory Card International Association (PCMCIA) slot and card, etc. Software and data transferred via the communication interface 1024 are in the form of signals 1028, which may be electronic, electromagnetic, optical, or other signals capable of being received by communication interface 1024. These signals 1028 are provided to the communication interface 1024 via a communication path 1026. The communication path 1026 carries signals 1028 and may be implemented using wire or cable, fiber optics, a phone line, a wireless link, a cellular phone link, a radio frequency link, or any other suitable communication channel. For instance, the communication path 1026 may be implemented using a combination of channels.

The terms "computer program medium" and "computer usable medium" are used generally to refer to media such as a removable storage drive 1014, a hard disk installed in hard disk drive 1012, and signals 1028. These computer program products are means for providing software to the computer system 1000. However, these terms may also include signals (such as electrical, optical or electromagnetic signals) that embody the computer program disclosed herein.

Computer programs (also called computer control logic) are stored in the main memory 1008 and/or the secondary memory 1010. Computer programs may also be received via a communication interface 1024. Such computer programs, when executed, enable the computer system 1000 to implement embodiments of the present invention as discussed herein. Accordingly, such computer programs represent controllers of the computer system 1000. Where the embodiment is implemented using software, the software may be stored in a computer program product and loaded into the computer system 1000 using the removable storage drive 1014, the hard disk drive 1012, or the communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention.

For example, in the embodiment described above, the receipt portal system manages a web site hosted by a web server module to provide access to the receipt database through a URL web link provided in the electronic receipt that is accessed via a web browser. It will be appreciated that as an alternative to using a web browser, direct access to the receipt database can be provided through a mobile application running on the customer and merchant mobile electronic devices. The mobile application can be provided by the receipt portal system and pre-configured to access the receipt database. In such an alternative, the electronic receipt need not include the network address of the web server module, and instead can include an application identifier and an identifier associated with the stored receipt data, in order to configure the mobile electronic device to provide direct access through the identified mobile application.

In the embodiment described above, the mobile electronic devices store plurality of application modules (also referred to as computer programs or software) in memory, which when executed, enable the mobile electronic device to implement the functionality as discussed herein. As those skilled in the art will appreciate, the software may be stored in a computer program product and loaded into the mobile electronic device using any known instrument, such as removable storage disk or drive, hard disk drive, or communication interface, to provide some examples.

What is claimed is:

1. A payment transaction system, comprising:
   a merchant system including a merchant mobile electronic device that processes a payment transaction and a merchant authentication terminal that verifies an authentication token before settling the payment transaction;
   a transaction receipt portal system remote from the merchant system, the transaction receipt portal system stores receipt data for a completed payment transaction received from the merchant system, the receipt data being associated with a customer and a merchant registered with the payment transaction system;
   a customer computing device that receives an electronic receipt from the merchant system, whereby the electronic receipt includes an electronic link to an independent website separate from the merchant system, the independent website being hosted by an independent web server module, separate from the merchant system, of the transaction receipt portal system and the electronic receipt also includes an identifier associated with the stored receipt data for retrieving stored receipt data associated with the electronic receipt from the transaction receipt portal system; and
   wherein the electronic link to the web site enables the customer to securely login and review data from the payment transaction selected from the group consisting of line item purchases, merchant details including contact details, location of the merchant and transaction, and options to follow up with the merchant to request a refund.

2. The system of claim 1, wherein the electronic receipt is an e-mail message or an SMS message.

3. The system of claim 1, wherein the electronic receipt comprises a portion of the stored receipt data for a completed payment transaction.

4. The system of claim 3, wherein the web server module retrieves the stored receipt data for a completed payment transaction associated with the electronic receipt.

5. The system of claim 4, wherein the stored receipt data comprises enhanced data associated with the completed payment transaction.

6. The system of claim 1, wherein the transaction receipt portal system further comprises a database of registered users.

7. A computer-implemented method of processing a card payment transaction, the method comprising the steps of:
- processing, by a merchant system, a payment transaction through a merchant mobile electronic device and verifying an authentication token before settling the payment transaction;
- storing, in a transaction receipt portal system remote from the merchant system, receipt data for a completed payment transaction received from the merchant system, the receipt data being associated with a customer and a merchant registered with the system,
- receiving, by a customer computing device, an electronic receipt from the merchant system, the electronic receipt including an electronic link to an independent web site, separate from the merchant system, hosted by a web server module of the transaction receipt portal system and an identifier associated with the stored receipt data for retrieving stored receipt data from the transaction receipt portal system;
- providing access to the web server module hosting the web site for the stored receipt data, the electronic link to the web site enabling the customer to securely login and review data from the payment transaction selected from the group consisting of line item purchases, merchant details including contact details, location of the merchant and transaction, and options to follow up with the merchant to request a refund; and
- providing, by the transaction receipt portal system, stored receipt data to the associated registered customer or merchant.

8. The method of claim 7, wherein the electronic receipt includes data for configuring the computing device to retrieve stored receipt data from the transaction receipt portal system.

9. The method of claim 8, wherein the electronic receipt is provided in an e-mail message or an SMS message.

* * * * *